(12) United States Patent
Lu

(10) Patent No.: US 9,841,319 B2
(45) Date of Patent: Dec. 12, 2017

(54) LIGHT DETECTING DEVICE

(71) Applicant: UNITED MICROELECTRONICS CORP., Hsinchu (TW)

(72) Inventor: Tse-Yi Lu, Chiayi (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 477 days.

(21) Appl. No.: 14/083,594

(22) Filed: Nov. 19, 2013

(65) Prior Publication Data

US 2015/0136958 A1 May 21, 2015

(51) Int. Cl.
| G01J 1/42 | (2006.01) |
|---|---|
| G01J 1/02 | (2006.01) |
| G01J 1/04 | (2006.01) |
| H01L 27/30 | (2006.01) |

(52) U.S. Cl.
CPC .......... *G01J 1/4204* (2013.01); *G01J 1/0209* (2013.01); *G01J 1/0492* (2013.01); *H01L 27/305* (2013.01)

(58) Field of Classification Search
CPC ..... G01J 1/4204; G01J 1/0209; H01L 27/307; H01L 27/305; H01L 27/3211; H01L 27/3216
USPC .............................................. 250/208.1, 226
See application file for complete search history.

(56) References Cited

U.S. PATENT DOCUMENTS

| 3,930,295 A | 1/1976 | Rose |
|---|---|---|
| 4,148,048 A | 4/1979 | Takemoto |
| 4,460,912 A | 7/1984 | Takeshita |
| 4,533,624 A | 8/1985 | Sheppard |
| 4,644,172 A | 2/1987 | Sandland |
| 4,745,451 A | 5/1988 | Webb |
| 4,951,104 A | 8/1990 | Kato |
| 5,070,380 A | 12/1991 | Erhardt |
| 5,241,417 A | 8/1993 | Sekiguchi |
| 5,246,803 A | 9/1993 | Hanrahan |
| 5,294,288 A | 3/1994 | Melpolder |
| 5,321,297 A | 6/1994 | Enomoto |
| 5,466,926 A | 11/1995 | Sasano |
| 5,587,696 A | 12/1996 | Su |
| 5,625,210 A | 4/1997 | Lee |
| 5,650,864 A | 7/1997 | Tseng |
| 5,830,624 A | 11/1998 | Bae |
| 5,880,495 A | 3/1999 | Chen |
| 5,977,535 A | 11/1999 | Rostoker |
| 6,006,764 A | 12/1999 | Chu |
| 6,071,826 A | 6/2000 | Cho |
| 6,081,018 A | 6/2000 | Nakashiba |
| 6,087,211 A | 7/2000 | Kalnitsky |
| 6,124,200 A | 9/2000 | Wang |
| 6,137,100 A | 10/2000 | Fossum |

(Continued)

*Primary Examiner* — Georgia Y Epps
*Assistant Examiner* — Don Williams
(74) *Attorney, Agent, or Firm* — WPAT, PC

(57) ABSTRACT

A light detecting device is provided, comprising a substrate having a patterned metal layer formed thereon; a dielectric layer formed on the substrate, first pixel element formed on the dielectric layer, and a second pixel element. The dielectric layer at least has a first trench, and the first trench is positioned below the level of the first pixel element. The second pixel element comprises a buried portion formed correspondingly to the first trench, and an upper portion formed on the buried portion. The upper portion of the second pixel element is positioned at the same level of the first pixel element.

16 Claims, 3 Drawing Sheets

(56) References Cited

U.S. PATENT DOCUMENTS

| | | |
|---|---|---|
| 6,294,313 B1 | 9/2001 | Kobayashi |
| 6,297,160 B1 | 10/2001 | Chien |
| 6,338,976 B1 | 1/2002 | Huang |
| 6,352,876 B1 | 3/2002 | Bordogna |
| 6,369,417 B1 | 4/2002 | Lee |
| 6,376,797 B1 | 4/2002 | Piwczyk |
| 6,388,278 B1 | 5/2002 | Suzuki |
| 6,407,415 B2 | 6/2002 | Lee |
| 6,433,844 B2 | 8/2002 | Li |
| 6,482,669 B1 | 11/2002 | Fan |
| 6,501,065 B1* | 12/2002 | Uppal ............... H01L 27/14665 250/208.1 |
| 6,514,810 B1 | 2/2003 | Kim |
| 6,566,151 B2 | 5/2003 | Yeh |
| 6,617,189 B1 | 9/2003 | Chen |
| 6,632,700 B1 | 10/2003 | Fan |
| 6,641,464 B1 | 11/2003 | Steere, III |
| 6,664,191 B1 | 12/2003 | Kim |
| 6,730,555 B2 | 5/2004 | Kim |
| 6,794,215 B2 | 9/2004 | Park |
| 6,821,809 B2 | 11/2004 | Abe |
| 6,841,848 B2 | 1/2005 | MacNamara |
| 6,846,722 B2 | 1/2005 | Lee |
| 6,849,533 B2 | 2/2005 | Chang |
| 6,872,584 B2 | 3/2005 | Nakashiba |
| 6,921,934 B2 | 7/2005 | Patrick |
| 6,933,972 B2 | 8/2005 | Suzuki |
| 6,953,608 B2 | 10/2005 | Leu |
| 6,960,512 B2 | 11/2005 | Cheng |
| 7,006,294 B2 | 2/2006 | Steenblik |
| 7,078,779 B2 | 7/2006 | Wang |
| 7,115,924 B1 | 10/2006 | LaMaster |
| 7,129,172 B2 | 10/2006 | Morrow |
| 7,180,044 B2 | 2/2007 | Yu |
| 7,199,439 B2 | 4/2007 | Farnworth |
| 7,229,745 B2 | 6/2007 | Lamarre |
| 7,315,359 B2 | 1/2008 | Hong |
| 7,328,915 B2 | 2/2008 | Smith |
| 7,498,190 B2 | 3/2009 | Kao |
| 7,648,851 B2 | 1/2010 | Fu |
| 7,960,807 B2 | 6/2011 | Lin |
| 2001/0023086 A1 | 9/2001 | Park |
| 2004/0122328 A1 | 6/2004 | Wang |
| 2005/0024520 A1 | 2/2005 | Yamamoto |
| 2005/0103983 A1 | 5/2005 | Yamaguchi |
| 2005/0121599 A1 | 6/2005 | Mouli |
| 2005/0186739 A1 | 8/2005 | Wang |
| 2005/0247963 A1 | 11/2005 | Chen |
| 2005/0274988 A1 | 12/2005 | Hong |
| 2005/0274996 A1 | 12/2005 | Iwawaki |
| 2006/0054946 A1 | 3/2006 | Baek |
| 2006/0124833 A1 | 6/2006 | Toda |
| 2006/0146230 A1 | 7/2006 | Joon |
| 2006/0146412 A1 | 7/2006 | Kim |
| 2006/0172451 A1 | 8/2006 | Park |
| 2006/0183265 A1 | 8/2006 | Oh |
| 2006/0231898 A1 | 10/2006 | Jeong |
| 2007/0010042 A1 | 1/2007 | Li |
| 2007/0012970 A1 | 1/2007 | Mouli |
| 2007/0018073 A1 | 1/2007 | Hsu |
| 2007/0023851 A1 | 2/2007 | Hartzell |
| 2007/0031988 A1 | 2/2007 | Agranov |
| 2007/0052050 A1 | 3/2007 | Dierickx |
| 2007/0072326 A1 | 3/2007 | Zheng |
| 2007/0096173 A1 | 5/2007 | Kim |
| 2007/0117253 A1 | 5/2007 | Hsu |
| 2007/0158772 A1 | 7/2007 | Boettiger |
| 2007/0166649 A1 | 7/2007 | Yu |
| 2007/0202696 A1 | 8/2007 | Inuiya |
| 2007/0235771 A1 | 10/2007 | Liu |
| 2008/0036020 A1 | 2/2008 | Ko |
| 2008/0055733 A1 | 3/2008 | Lim |
| 2008/0079103 A1 | 4/2008 | Liao |
| 2008/0121805 A1 | 5/2008 | Tweet |
| 2008/0121951 A1 | 5/2008 | Kao |
| 2008/0157144 A1 | 7/2008 | Lee |
| 2008/0169546 A1 | 7/2008 | Kwon |
| 2008/0265348 A1 | 10/2008 | Maas |
| 2009/0032490 A1 | 2/2009 | Tsai |
| 2009/0066954 A1 | 3/2009 | Opsal |
| 2009/0121264 A1 | 5/2009 | Kao |
| 2009/0124037 A1 | 5/2009 | Yu |
| 2009/0127643 A1 | 5/2009 | Lu |
| 2009/0134484 A1 | 5/2009 | Lin |
| 2009/0168181 A1 | 7/2009 | Su |
| 2009/0200585 A1 | 8/2009 | Nozaki |
| 2009/0212335 A1 | 8/2009 | Kao |
| 2009/0256258 A1 | 10/2009 | Kreupl |
| 2009/0294888 A1 | 12/2009 | Tsai |
| 2009/0321862 A1 | 12/2009 | Yu |
| 2010/0003623 A1 | 1/2010 | Liu |
| 2010/0038688 A1 | 2/2010 | Wu |
| 2010/0044813 A1 | 2/2010 | Wu |
| 2010/0096359 A1 | 4/2010 | Shiu |
| 2010/0144156 A1 | 6/2010 | Shih |
| 2010/0159632 A1 | 6/2010 | Rhodes |
| 2010/0282953 A1* | 11/2010 | Tam ..................... G01J 1/1626 250/226 |
| 2010/0315734 A1 | 12/2010 | Wu |
| 2011/0057277 A1 | 3/2011 | Yu |
| 2014/0015085 A1* | 1/2014 | Ikeda ................ H01L 31/02325 257/432 |

* cited by examiner

LIGHT DETECTING DEVICE

BACKGROUND

Technical Field

The disclosure relates in general to a light detecting device, and more particularly to a light detecting device with a buried trench for an ambient light sensor.

Description of the Related Art

Ambient light sensors detect the amount of light available and help a processor determine the amount of backlight or illumination for an image sensor in an application, such as displays (ex:LCDs) of electronic products (such as cell phones and laptop computers, and for various other types of light level measurement and management). By using the ambient light sensor to detect bright and dim ambient light conditions, the backlight of the display can be controllable and adjustable to reduce overall display-system power consumption. Therefore, use of ambient light sensor saves energy for the display and increases lifespan of the display.

However, the current approaches of the image sensors still have many problems to be solved; for example, one current approach uses black photo-resist as the ambient light sensor, which one more color filter layer is needed besides red, green and blue filter layers, thereby increasing the production cost. Other current approach of an image sensor, which has the pixels each comprising an ambient light sensor and the sub-pixels constructed in different planes, has issue of image distortion.

SUMMARY

The disclosure is directed to a light detecting device having a buried trench for an ambient light sensor (ALS). The structure and manufacturing method of the light detecting device of the disclosure are simple and easy, which is time-saving and able to maintain a low production cost. Also, the light detecting device of the embodiment provides a better optical performance.

According to the disclosure, a light detecting device is provided, comprising a substrate having a patterned metal layer formed thereon; a dielectric layer formed on the substrate, first pixel element formed on the dielectric layer, and a second pixel element. The dielectric layer at least has a first trench, and the first trench is positioned below the level of the first pixel element. The second pixel element comprises a buried portion formed correspondingly to the first trench, and an upper portion formed on the buried portion. The upper portion of the second pixel element is positioned at the same level of the first pixel element.

According to the disclosure, another light detecting device is provided, comprising a substrate having a patterned metal layer formed thereon; a dielectric layer formed on the substrate, first pixel element formed on the dielectric layer, and a second pixel element. The dielectric layer has a first trench and a second trench, wherein the first and the second trenches are positioned below the level of the first pixel element. The second pixel element comprises a buried portion formed correspondingly to the first trench, and an upper portion formed on the buried portion. The upper portion of the second pixel element is positioned at the same level of the first pixel element. Also, the light-blocking layer is formed correspondingly to the second trench.

Figure 1A:
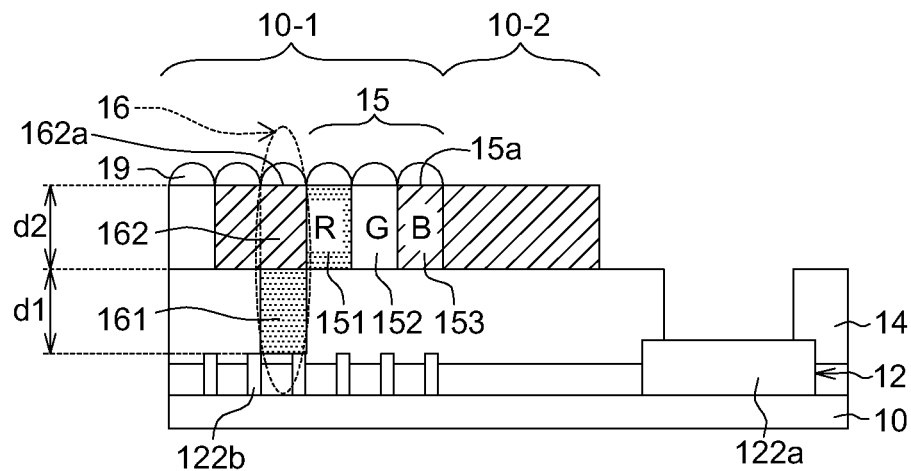
FIG. 1A schematically illustrates a light detecting device according to the first embodiment of the present disclosure, which the color filter materials have been formed.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the embodiment of the present disclosure, a light detecting device is provided. In the light detecting device of the embodiment, the pixel element having a buried trench filled with a buried color filter material is constructed, and another color filter material is stacked on the buried color filter material to form a stack of color filter materials for optically shielding the visible light and passing/cutting IR, thereby functioning as an ambient light sensor (ALS) of the light detecting device. The structure and manufacturing method of the integrated ALS with buried color filter of the disclosure are simple and easy, which is time-saving and able to maintain a low production cost. Also, the embodiment of the disclosure provides a better optical performance since no defect of image distortion occurs.

Embodiments are provided hereinafter with reference to the accompanying drawings for describing the related configurations, but the present disclosure is not limited thereto. The identical and/or similar elements of the embodiments are designated with the same and/or similar reference numerals. It is also important to point out that the illustrations may not be necessarily be drawn to scale. Thus, the specification and the drawings are to be regard as an illustrative sense rather than a restrictive sense.

Two embodiments are provided hereinafter with reference to the accompanying drawings for describing the related procedures, but the present disclosure is not limited thereto. It is noted that not all embodiments of the invention are shown. Modifications and variations can be made without departing from the spirit of the disclosure to meet the requirements of the practical applications. Thus, there may be other embodiments of the present disclosure which are not specifically illustrated.

First Embodiment

Figure 1B:
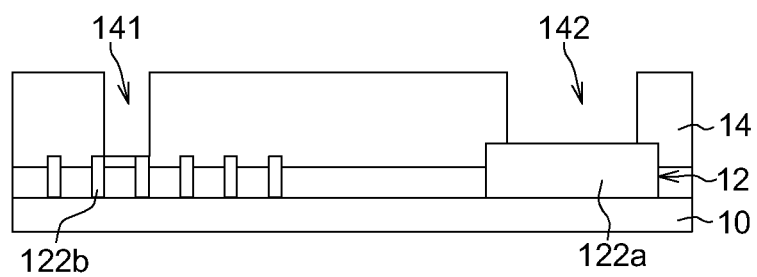
FIG. 1B schematically illustrates parts of the light detecting device of FIG. 1A before forming the color filter materials.

FIG. 1A schematically illustrates a light detecting device according to the first embodiment of the present disclosure, which the color filter materials have been formed. FIG. 1B schematically illustrates parts of the light detecting device of FIG. 1A before forming the color filter materials. Please refer to FIG. 1A and FIG. 1B.

As shown in FIG. 1A, a light detecting device 1 of the first embodiment comprises a substrate 10 having a patterned metal layer 12 formed thereon, a dielectric layer 14 formed on the substrate 10 and having a first trench 141, a first pixel element 15 formed on the dielectric layer 14, and a second pixel element 16. In FIG. 1A, the second pixel element 16 includes a buried portion 161 correspond to the first trench 141, and an upper portion 162 formed on the buried portion 161. According to the embodiment, the first trench 141 is positioned below the level of the first pixel element 15. The first trench 141 of FIG. 1B is filled with an adequate color filter material to form the buried portion 161 of the second pixel element 16. In one application, the second pixel element 16 can be functioned as an ambient light sensor (ALS) of a light detecting device.

As shown in FIG. 1B, the first trench 141 can be simultaneously defined, and can be formed with the pad opening 142 in the pad etching step. Therefore, no extra photo layer is required for forming the first trench 141.

According to the embodiment, the upper portion 162 of the second pixel element 16 is positioned at the same level of the first pixel element. Therefore, in one embodiment, a top surface 162a of the upper portion 162 of the second pixel element 16 is substantially aligned with a top surface 15a of the first pixel element 15, as shown in FIG. 1A.

According to the embodiment, a stack of color filter materials, such as a stack of different color filter materials can be used for being the ALS. For example, the second pixel element 16 comprises a stack of blue and red color filter layers.

In one embodiment, the first pixel element 15 has primary colors, such as red (R), green (G) and blue (B) respectively. As shown in FIG. 1A, the first pixel element 15 comprises a R sub-pixel 151, a G sub-pixel 152, and a B sub-pixel 153. In one embodiment, the buried portion 161 and the upper portion 162 of the second pixel element 16 (i.e. ALS) can comprise a red color filter material and a blue color filter material for shielding the invisible light, respectively. However, the disclosure is not limited thereto, and the colors of two portions of the second pixel element 16 can be selected and changed according to the color arrangement of the first pixel element 15 (151/152/153) in the practical application. For example, in another embodiment, the buried portion 161 and the upper portion 162 of the second pixel element 16 (i.e. ALS) may comprise a blue color filter material and a red color filter material, respectively.

It is noted that the R, G and B color filter materials of the embodiment are not particularly limited, and can be modified depending on the actual needs of the practical application. Also, depths (/thicknesses) and/or the depth ratio of the buried portion 161 to the upper portion 162 of the second pixel element 16 may be adjusted and determined according to the material selection of R, G and B color in the practical application to obtain a better result for shielding the visible light. In one embodiment, a first depth d1 of the buried portion 161 is substantially equal to a second depth d2 of the upper portion 162 of the second pixel element 16. However, the disclosure is not limited thereto. Adequate depth ratio of the buried portion 161 to the upper portion 162 of the second pixel element 16 can be determined based on the optical properties of the color filter materials and the combination of optical light-shielding result. Thus, modifications and variations can be made without departing from the spirit of the disclosure to meet the requirements of the practical applications.

Additionally, material of the dielectric layer 14 of the embodiment can be carefully selected for preventing the decay of light. In one embodiment, the dielectric layer comprises oxide, such as an undoped oxide layer (i.e., pure oxide). The light would not be decayed by the oxide, in particular, the pure oxide which is undoped. It is also acceptable to adopt other material that causes no decay of light for fabricating the dielectric layer. For example, nitride would cause the light decay, and it is not appropriate to adopt nitride for making the dielectric layer.

Moreover, the light detecting device 1 of the first embodiment further comprises an U-lense layer 19 continuously formed on the top surfaces of the first pixel element 15 and the second pixel element 16. Since the top surface 162a of the upper portion 162 of the second pixel element 16 is substantially aligned with the top surface 15a of the first pixel element 15, the U-lense layer 19 contacts the top surfaces of the first pixel element 15 and the second pixel element 16 according to the embodiment.

In a conventional light detecting device, the second pixel element (ex. as an ambient light sensor) and the first pixel element (ex. comprising R, G, B sub-pixels) have different step heights, and one or several planarization layers are required for the planarization of the first and second pixel elements before forming the lens layer. Since the lens layer of the conventional light detecting device is spaced apart from the first and second pixel elements, issue of image distortion raises, and the production cost is also increased due to addition of the planarization layers. This problem has been solved by the structure and method of the embodiment. According to the embodiment, the top surface 162a of the upper portion 162 of the second pixel element 16 is substantially aligned with the top surface 15a of the first pixel element 15, the U-lense layer 19 can be directly formed at the top surfaces of the first pixel element 15 and the second pixel element 16, which requires no extra planarization layers. Therefore, no image distortion occurs in the light detecting device of the embodiment, and the production cost can be maintained consequently.

Additionally, the manufacturing method of the light detecting device of the embodiment is simple and easy, which is time-saving and suitable for mass production. In one embodiment, the light detecting device of the embodiment can be fabricated by a process comprising the pad opening procedure on the patterned metal layer 12, the red color filter material definition, the green color filter material definition, the blue color filter material definition, the U-lens definition, cap oxide formation (ex: a thin oxide layer may cap on the U-lens layer 19 and deposited in the pad opening 142), and pad re-opening (i.e. removing the oxide to re-expose the pad opening 142). In the pad opening procedure, the first trench 141 is simultaneously defined with the pad opening 142. Furthermore, the color filter material definition in the first trench 141 for forming the buried portion 161 and in the portion of the first pixel element 15 for forming the sub-pixel 151/152/153 can be performed simultaneously or independently. The disclosure has no particularly limitation thereto.

Second Embodiment

Figure 2A:
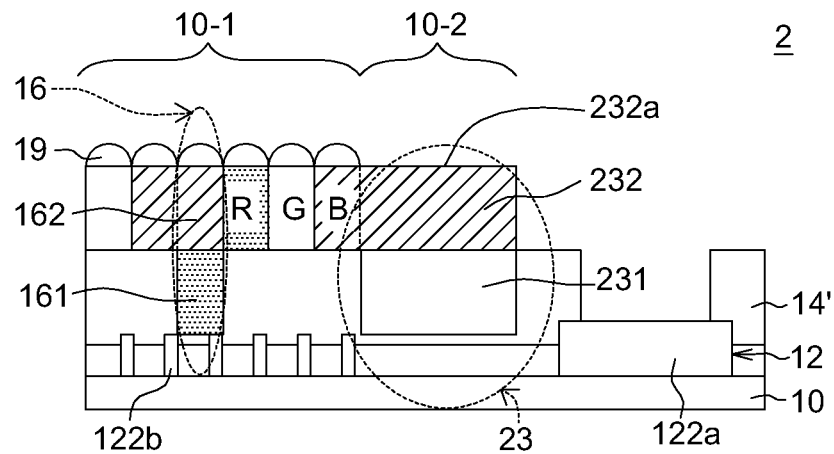
FIG. 2A schematically illustrates a light detecting device according to the second embodiment of the present disclosure, which the color filter materials have been formed.
Figure 2B:
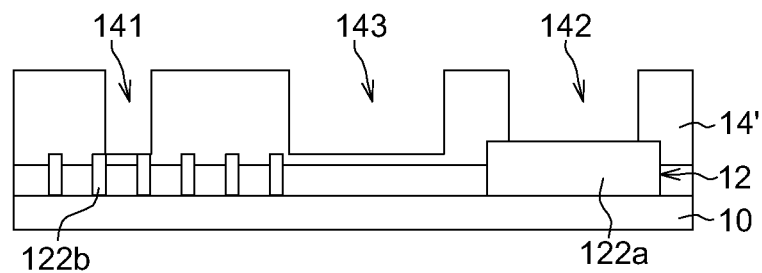
FIG. 2B schematically illustrates parts of the light detecting device of FIG. 2A before forming the color filter materials.

FIG. 2A schematically illustrates a light detecting device according to the second embodiment of the present disclosure, which the color filter materials have been formed. FIG. 2B schematically illustrates parts of the light detecting device of FIG. 2A before forming the color filter materials. Please refer to FIG. 2A and FIG. 2B.

The identical/similar elements of the first and second embodiments are designated with the same/similar reference numerals. The light detecting device 2 of the second embodiment is identical to the light detecting device 1 of the first embodiment, except for the optical block feature (i.e. the light blocking layer 23) setting at the peripheral region 10-2 outside the array region 10-1 for shielding the light in the second embodiment. It is noted that no lens is formed on the light blocking layer 23 in the second embodiment.

In the second embodiment, the dielectric layer 14 formed on the substrate 10 has a first trench 141 and a second trench 143. As shown in FIG. 2A, the light-blocking layer 23 comprises a buried block portion 231 and an upper block portion 232 formed on the buried block portion 231, wherein the buried block portion 231 is formed by filling a color filter material in the second trench 143, and the upper block portion 232 is formed by using different color filter material. For example, similar to the second pixel element 16 (i.e. being the ALS), the light-blocking layer 23 comprises a stack of color filter layers with different colors (ex: blue and red).

As shown in FIG. 2B, the first trench 141 and the second trench 143 can be simultaneously defined, and can be formed with the pad opening 142 in the pad etching step. Therefore, no extra photo layer is required for forming the first trench 141 and the second trench 143. Also, the filling step of color filter materials in the first trench 141 and the second trench 143 can be performed simultaneously for the convenience of the manufacturing process. Thus, the structure and manufacturing method of the light detecting device (with the buried portion 161 and the buried block portion 231) according to the second embodiment are simple and easy, which is time-saving and able to maintain the low production cost.

Also, the color arrangement of the color filter materials of the second pixel element 16 in the array region 10-1 can be the same as that of the light-blocking layer 23 in the peripheral region 10-2 for the convenience of the manufacturing process. In one embodiment, the buried portion 161 of the second pixel element 16 and the buried block portion 231 of the light-blocking layer 23 comprise the red color filter material, while the upper portion 162 of the second pixel element 16 and the upper block portion 232 of the light-blocking layer 23 comprise the blue color filter material for shielding the light. In another embodiment, the buried portion 161 of the second pixel element 16 and the buried block portion 231 of the light-blocking layer 23 comprise the blue color filter material, while the upper portion 162 of the second pixel element 16 and the upper block portion 232 of the light-blocking layer 23 comprise the red color filter material for shielding the light. However, the disclosure is not limited thereto, and other arrangement without departing from the spirit of the disclosure can be made.

In the second embodiment, the buried portion 161 of the second pixel element 16 and the buried block portion 231 of the light-blocking layer 23 are positioned below the level of first pixel element 15. Accordingly, a top surface 162a of the upper portion 162 of the second pixel element 16 and a top surface 232a of the upper block portion 232 of the light-blocking layer 23 are substantially aligned with a top surface 15a of the first pixel element 15. Thus, the U-lense layer 19 is continuously formed on the top surfaces of the first pixel element 15 and the second pixel element 16, and no lens is formed on the light blocking layer 23. Compared to the conventional light detecting device, the embodiment provides a better optical performance since no defect of U-lense distortion occurs.

Similar to the description in the first embodiment, the manufacturing method of the light detecting device of the second embodiment is simple and easy, and one exemplified process of the manufacturing method comprises the pad opening procedure on the patterned metal layer 12, the red color filter material definition, the green color filter material definition, the blue color filter material definition, the U-lens definition, cap oxide formation and pad re-opening (i.e. removing the oxide to re-expose the pad opening 142). In the pad opening procedure, the first trench 141 and the second trench 143 are simultaneously defined with the pad opening 142. Furthermore, the color filter material definition in the first trench 141 for forming the buried portion 161 and in the second trench 143 for forming the buried block portion 231 of the light-blocking layer 23 can be performed simultaneously with, or independently from, that in the portion of the first pixel element 15 for forming the sub-pixel 151/152/153. The disclosure has no particularly limitation thereto.

Third Embodiment

In the first embodiment and the second embodiment, the buried portions 161 of the second pixel elements 16 are all illustrated as being formed above the patterned metal layer 12. However, the disclosure is not limited thereto. Position of the buried portion 161 of the second pixel element 16 related to the patterned metal layer 12 can be modified and changed according to the design requirements of the practical applications.

Figure 3A:
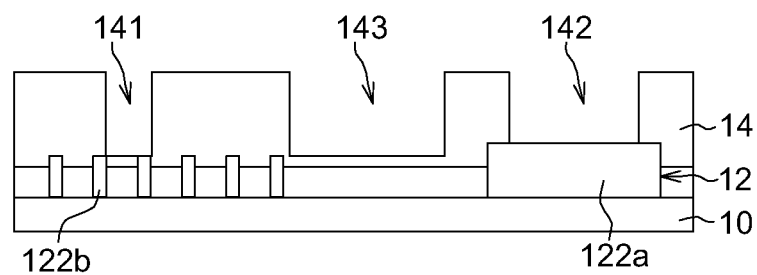
FIG. 3A depicts a configuration of a first trench and the second trench of the light detecting device according to the second embodiment.
Figure 3B:
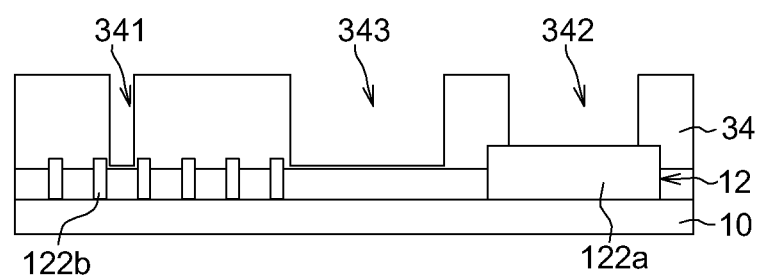
FIG. 3B depicts a configuration of a first trench and the second trench of a light detecting device according to the third embodiment.

FIG. 3A depicts a configuration of a first trench and the second trench of the light detecting device according to the second embodiment. FIG. 3B depicts a configuration of a first trench and the second trench of a light detecting device according to the third embodiment.

Please also refer to FIG. 2A for the other elements of the light detecting device. As shown in FIG. 3A, the first trench 141 for forming the buried portions 161 of the second pixel elements 16 is formed above the patterned metal layer 12. As shown in FIG. 3B, the first trench 341 for forming the buried portions 161 of the second pixel elements 16, as well as the second trench 342 for forming the buried block portion 231 of the light-blocking layer 23, can be positioned between adjacent metal lines 122b of the patterned metal layer 12. The bottom of the first trench 341 and the second trench 342 are below the top surface of the patterned metal layer 12.

According to the aforementioned descriptions, a light detecting device is provided. A pixel element (i.e. the second pixel element) having a buried trench filled with a buried color filter material and another color filter material is stacked on the buried color filter material is constructed for optically shielding the visible light and passing/cutting IR, thereby functioning as an ambient light sensor (ALS) of the light detecting device. The structure and manufacturing method of the integrated ALS with buried trench filled with color filter material of the disclosure are simple and easy, which is time-saving and able to maintain a low production cost. The embodiment of the disclosure is suitable for massive production. Also, the light detecting device of the embodiment provides a better optical performance since no defect of U-lense distortion occurs.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light detecting device, comprising:
a substrate having a patterned metal layer formed thereon;
a dielectric layer formed on the substrate and having a first trench;
a first pixel element formed on the dielectric layer, wherein the first trench is positioned below the level of the first pixel element;
a second pixel element, comprising:
a buried portion formed in the first trench and positioned between adjacent metal lines of the patterned metal layer; and
an upper portion, formed on the buried portion, and the upper portion positioned at the same level of the first pixel element, wherein, the second pixel element comprises a stack of color filter materials of only blue and red colors, a first depth of one of the color filter materials of the blue and red colors is substantially equal to a second depth of the other of the color filter materials of the blue and red color; and
a U-lens layer on the first pixel element and the second pixel element.

2. The light detecting device according to claim 1, wherein the second pixel element is an ambient light sensor (ALS), and the first pixel element has primary colors wherein said primary colors are red, green and blue respectively.

3. The light detecting device according to claim 1, wherein the buried portion of the second pixel element comprises the color filter material of the red color, and the upper portion of the second pixel element comprises the color filter material of the blue color.

4. The light detecting device according to claim 1, wherein the buried portion of the second pixel element comprises the color filter material of the blue color, and the upper portion of the second pixel element comprises the color filter material of the red color.

5. The light detecting device according to claim 1, wherein a top surface of the upper portion of the second pixel element is substantially aligned with a top surface of the first pixel element.

6. The light detecting device according to claim 5, wherein the U-lense layer is formed on the top surfaces of the first and the second pixel elements.

7. The light detecting device according to claim 1, wherein the dielectric layer comprises oxide.

8. A light detecting device, comprising:
a substrate having a patterned metal layer formed thereon;
a dielectric layer formed on the substrate, and the dielectric layer having a first trench and a second trench;
a first pixel element formed on the dielectric layer, wherein the first and the second trenches are positioned below the level of the first pixel element;
a second pixel element, comprising:
a buried portion formed in the first trench and positioned between adjacent metal lines of the patterned metal layer; and
an upper portion, formed on the buried portion, and the upper portion positioned at the same level of the first pixel element, wherein the second pixel element comprises a stack of color filter materials of only blue and red colors, a first depth of one of the color filter materials of the blue and red colors is substantially equal to a second depth of the other of the color filter materials of the blue and red colors;
a light-blocking layer, formed correspondingly to the second trench; and
a U-lens layer on the first pixel element and the second pixel element.

9. The light detecting device according to claim 8, wherein the light-blocking layer is positioned at a peripheral region outside an array of the first and second pixel elements for shielding light.

10. The light detecting device according to claim 8, wherein the light-blocking layer comprises another stack of blue and red color filter layers.

11. The light detecting device according to claim 8, wherein the light-blocking layer comprises a buried block portion corresponding to the second trench and an upper block portion formed on the buried block portion.

12. The light detecting device according to claim 11, wherein the buried portion of the second pixel element and the buried block portion of the light-blocking layer comprise the color filter material of the red color, while the upper portion of the second pixel element and the upper block portion of the light-blocking layer comprise the color filter material of the blue color.

13. The light detecting device according to claim 11, wherein the buried portion of the second pixel element and the buried block portion of the light-blocking layer comprise the color filter material of the blue color, while the upper portion of the second pixel element and the upper block portion of the light-blocking layer comprise the color filter material of the red color.

14. The light detecting device according to claim 11, wherein a top surface of the upper portion of the second pixel element and a top surface of the upper block portion of the light-blocking layer are substantially aligned with a top surface of the first pixel element.

15. The light detecting device according to claim 14, wherein the U-lense layer is continuously formed on the top surfaces of the first and the second pixel elements.

16. The detecting device according to claim 11, wherein the buried portion of the second pixel element and the buried block portion of the light-blocking layer have substantially the same depth.

* * * * *